Feb. 19, 1963  F. REEDER  3,078,143
REGENERATION OF AN AQUEOUS INORGANIC THIOCYANATE SOLUTION
Filed Oct. 20, 1960
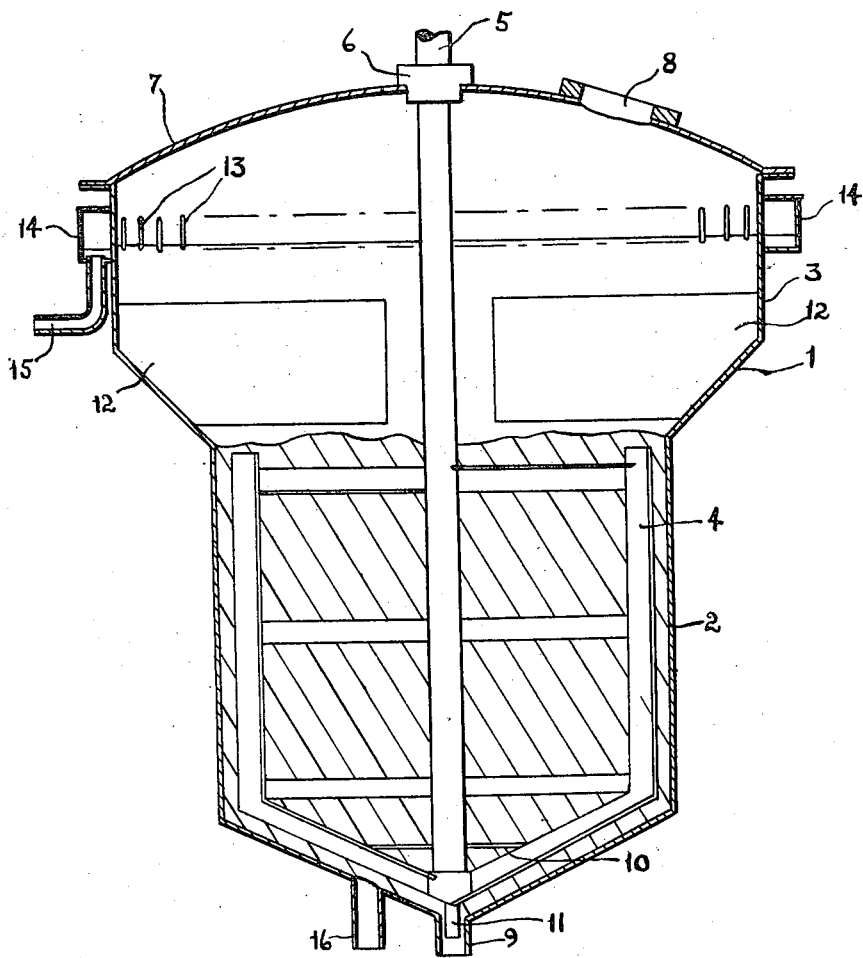
Inventor
Frank Reeder
By his attorneys
Howson and Howson 3,078,143
REGENERATION OF AN AQUEOUS INORGANIC THIOCYANATE SOLUTION
Frank Reeder, Coventry, England, assignor to Courtaulds Limited, London, England, a British company
Filed Oct. 20, 1960, Ser. No. 63,924
Claims priority, application Great Britain Oct. 26, 1959
2 Claims. (Cl. 23—75)

This invention is concerned with inorganic thiocyanate solutions, such as may be used as solvent in the preparation of polyacrylonitrile and in the production therefrom of shaped articles such as threads, fibres, filaments, staple fibres, ribbons and films, hereinafter referred to as "threads." In particular, it is concerned with the regeneration of the thiocyanate solution. By "polyacrylonitrile" we mean both homopolymers of acrylonitrile and also copolymers containing at least 80 percent by weight of acrylonitrile units. Such copolymers may be the products of copolymerisation with acrylonitrile of such other monomers as styrene, methyl acrylate, itaconic acid, methallyl sulphonic acid and its salts, vinyl acetate and vinyl pyridine. The invention is particularly applicable to copolymers containing 90 to 95 percent by weight of acrylonitrile units.

We have described in specification No. 2,923,694 a process for the production of a polyacrylonitrile solution, which comprises dissolving acrylonitrile, together with the other copolymerisable compounds when such are used, in a concentrated aqueous or aqueous/alcoholic solution of an inorganic thiocyanate and polymerising the monomer or monomers in solution in the presence of a non-oxidising polymerisation catalyst forming free radicals. Examples are given therein of suitable free-radical-forming catalysts.

The use of these catalysts unfortunately may give rise to discoloration of the solution, which tends to persist in the threads prepared from the solution.

This discoloration may be reduced by carrying out the polymerisation at a pH of 3.5 to 8.0, in particular in the range 3.5 to 5.5, in the presence of a reducing agent which is inert to the catalyst under the conditions of polymerisation. Among other reducing agents, thiourea dioxide (otherwise known as formamidine sulphinic acid), sodium formaldehyde sulphoxylate and sodium metabisulphite are suitable. However, the use of these sulphur-containing reducing agents gives rise to the formation of sulphate ions. When the solvent for the polymerisation is an inorganic thiocyanate solution and the threads are spun into a more dilute solution of the same salt, in which case it is usual to concentrate the spin bath liquor and recycle it as solvent, recycling of the solution results in the concentration of sulphate increasing until the normal solubility in the solution is exceeded and a solution which is supersaturated in inorganic sulphate is obtained. The supersaturated solution tends to deposit crystals in the spinning and solvent recycling systems, with such adverse results as blockage of the spinning orifices and filters.

It is therefore an object of this invention to provide a process for reducing the sulphate ion content of an inorganic thiocyanate solution supersaturated in an inorganic sulphate.

The process according to the invention comprises passing the supersaturated solution through a slurried bed of a sulphate salt. In the case of spent thiocyanate solutions from acrylonitrile polymerisation, optionally followed by wet spinning of threads from the solution, the sulphate in supersaturated solution will often have the same cation as the thiocyanate, e.g. the sodium ion. Whatever the cation or cations, the sulphate salt in the slurried bed may if desired be the same as the sulphate in solution.

The process may advantageously be carried out with the solution at an elevated temperature. Increasing the temperature has two effects on the process, the relative merits of which must be considered in choosing an operating temperature. Firstly, the rate of precipitation of the inorganic sulphate from solution is increased but secondly, the value to which the sulphate concentration falls may also be increased. It is therefore desirable to choose a temperature which gives the best precipitation rate consistent with a satisfactory final sulphate concentration. If it is intended ultimately to make use of the treated solution at a lower temperature than the selected process temperature, in which case the non-supersaturated solution obtained may be made supersaturated by the decrease in temperature, it is preferable that the treated solution be diluted before it is subsequently used. A preferred process in general is to concentrate the solution, as by evaporation, before passing it through the slurried bed and then to dilute the solution after treatment. The effect of concentrating a solution before treatment may be to make a solution supersaturated which would not otherwise have been treatable according to the invention.

After the solution has been passed through the bed, it is preferably passed through a zone of minimum turbulence, wherein entrained solid sulphate may settle. Solids still carried by the solution may then be removed, e.g. by filtration or centrifuging.

It is desirable that the rate of linear flow of the solution through the bed be kept fairly low, since at higher flow rates more of the bed is carried away by the solution. Preferably the linear rate of flow does not exceed 65 cm./hour in the case of the I.C.I. commercial grade of anhydrous sodium sulphate which is sold under the name "Kemsol."

The quantity of sulphate constituting the slurry depends upon the volumetric flow rate. Obviously if the volume of solution passed in a given time is increased, a greater minimum quantity of solid sulphate must be employed to reduce the sulphate content of the solution substantially to the saturation concentration. We have found that, to reduce the sodium sulphate content of a supersaturated solution to near the saturation concentration, preferably at least 0.9 kgm. of Kemsol should be used for each litre/hour of flow rate. To reduce the sulphate content to this level may mean that it is necessary to pass the solvent through the bed more than once, depending upon the original sulphate concentration.

A form of apparatus suitable for the continuous removal of sodium sulphate from a sodium thiocyanate solution containing it at supersaturation level is illustrated in the acompanying drawing, which is a vertical section.

Referring to the drawing, a vessel 1 comprises two generally cylindrical sections of different diameter, namely a slurry section 2 and a settlement section 3. A gate-type stirrer 4 on a shaft 5 conforms generally to the axial cross-section of the slurry section. The shaft 5 is rotated from above by an appropriate motor (not shown) and is guided by a bearing 6 located at the centre of the lid 7 of the vessel 1.

The introduction of sulphate salt into the tank is effected via a port 8, while during operation the supersaturated solution is continuously introduced via an inlet 9 at the bottom of the vessel 1. Distribution of the solution throughout the slurry is assisted by a distributor disc 10 carried by the shaft 5. Deposition of sulphate in the inlet 9 is prevented by a flat scraper 11 projecting from the end of the shaft 5 and rotating with the shaft.

Baffles 12 project into the vessel above the slurry bed and reduce the rotational flow of the liquid after it has passed through the bed.

The solution of reduced sulphate content flows from the vessel 1 through slots 13, disposed in a ring around the vessel. The slots are enclosed by an annular overflow channel 14, from which the solution drains continuously via an outlet pipe 15.

For removing the slurry at any time when it is desired to service the equipment, a slurry drain pipe 16 is provided.

*Example 1*

In a typical example of the use of the apparatus illustrated, an aqueous solution containing 54 percent by weight of sodium thiocyanate and 0.16 percent by weight of sodium sulphate was passed through 3 tons of "Kemsol" slurried in the vessel 1, at a rate of approximately 300 gallons/hour (representing a linear flow rate of about 40 cm./hour). The solution flowing from the outlet pipe 15 contained 0.13 percent by weight of sodium sulphate, together with a solid sulphate carry-over of about 0.03 percent, based on the weight of solution. The solid sulphate was subsequently removed in a centrifuge.

Similar experiments were carried out upon aqueous solutions containing 54 percent by weight of sodium thiocyanate and increased sodium sulphate concentration, for example 0.24 percent and 0.40 percent by weight. In each case, the solution obtained contained about 0.13 percent by weight of sodium sulphate.

*Example 2*

Using apparatus similar to, but smaller than, that employed in Example 1, a charge of 6.0 kgm. of Duisberger anhydrous sodium sulphate of technically pure grade, was put in the vessel. An aqueous solution containing 12 percent by weight of sodium thiocyanate, withdrawn as spent spin bath from a spinning machine in which a polyacrylonitrile polymer had been spun in sodium thiocyanate solution, was evaporated until it contained 53.6 percent of sodium thiocyanate and 0.179 percent of sodium sulphate by weight, which represents supersaturation in sodium sulphate.

The solution was passed at a temperature of 41° C. and a flow rate of 7.7 litres/hour (equivalent to a linear flow of 42 cm./hour) through the slurried sulphate bed, with the stirrer rotating at 35 revolutions per minute. The treated solution, after settling of the entrained solid sulphate, was found to contain 0.113 percent by weight of sodium sulphate and 53.8 percent by weight of sodium thiocyanate, with a solid sulphate carry over of 0.029 percent by weight in suspension. The solution was subsequently diluted to 51 percent sodium thiocyanate concentration, for use as solvent in a further acrylonitrile polymerisation.

What I claim is:

1. In the regeneration of an aqueous inorganic thiocyanate solution which has been used as the solvent in the polymerisation of acrylonitrile and is supersaturated in an inorganic sulphate, the process which comprises heating the solution to evaporate it down to increased concentration, passing the solution while still at an elevated temperature through a slurried bed of an inorganic sulphate, subsequently passing the solution through a zone of minimum turbulence to allow entrained solid sulphate to settle, removing solids from the solution and diluting the solution.

2. In the regeneration of an aqueous inorganic thiocyanate solution which has been used as the solvent in the polymerization of acrylonitrile and is supersaturated in an inorganic sulphate, the process which comprises heating the solution to evaporate it down to increased concentration, passing the solution while still at an elevated temperature through a slurried bed of an inorganic sulphate, subsequently passing the solution through a zone of minimum turbulence to allow entrained solid sulphate to settle, and removing solids from the solution.

References Cited in the file of this patent

UNITED STATES PATENTS

| 2,313,680 | Smith | Mar. 9, 1943 |
| 2,977,188 | Serreze et al. | Mar. 28, 1961 |

OTHER REFERENCES

McPherson and Henderson book, "A Course in General Chemistry," 3rd edition (1927), page 211; Ginn and Co., New York.